US010136062B1

(12) United States Patent
Kashiyama et al.

(10) Patent No.: US 10,136,062 B1
(45) Date of Patent: Nov. 20, 2018

(54) INFORMATION PROCESSING APPARATUS, MODE SELECTION METHOD, AND MODE SELECTION PROGRAM

(71) Applicant: LENOVO (SINGAPORE) PTE. LTD., Singapore (SG)

(72) Inventors: Hideki Kashiyama, Yokohama (JP); Takumi Imai, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/678,433

(22) Filed: Aug. 16, 2017

(30) Foreign Application Priority Data

May 18, 2017 (JP) .................................. 2017-098935

(51) Int. Cl.
| | |
|---|---|
| *H04N 9/73* | (2006.01) |
| *H04N 5/232* | (2006.01) |
| *H04N 5/235* | (2006.01) |
| *H04N 9/07* | (2006.01) |
| *H04N 5/225* | (2006.01) |

(52) U.S. Cl.
CPC ....... *H04N 5/23245* (2013.01); *H04N 5/2351* (2013.01); *H04N 9/07* (2013.01); *H04N 5/2256* (2013.01)

(58) Field of Classification Search
CPC .................................................. H04N 1/00328
See application file for complete search history.

(56) References Cited

U.S. PATENT DOCUMENTS

| | | | | |
|---|---|---|---|---|
| 7,983,524 | B2 * | 7/2011 | Honobe ................... | H04N 7/15 386/228 |
| 9,838,641 | B1 * | 12/2017 | Lim ......................... | H04N 5/77 |
| 2009/0086010 | A1 * | 4/2009 | Tiphane ................. | H04N 7/147 348/14.01 |
| 2010/0149370 | A1 * | 6/2010 | Kim ....................... | H04N 5/232 348/222.1 |
| 2012/0140085 | A1 * | 6/2012 | Gallinat ................. | H04N 5/225 348/207.1 |
| 2015/0009282 | A1 * | 1/2015 | Mai ........................ | H04N 7/147 348/14.12 |
| 2015/0058649 | A1 * | 2/2015 | Song ..................... | G06F 1/3231 713/323 |
| 2016/0037037 | A1 * | 2/2016 | Zou ....................... | H04N 5/232 348/262 |

FOREIGN PATENT DOCUMENTS

JP         2012119774 A        6/2012

* cited by examiner

*Primary Examiner* — Gary C Vieaux
(74) *Attorney, Agent, or Firm* — Shimokaji IP

(57) ABSTRACT

There is provided an information processing apparatus capable of setting a privacy mode intuitively and easily. The information processing apparatus capable of selecting the privacy mode includes: an imaging unit configured to acquire an image; a determination unit configured to acquire an output value related to the brightness of the image acquired by the imaging unit to determine whether the output value related to the brightness of the image meets a predetermined condition; and a mode selection unit configured to select the privacy mode when the determination unit determines that the output value related to the brightness of the image meets the predetermined condition.

11 Claims, 5 Drawing Sheets

INFORMATION PROCESSING APPARATUS, MODE SELECTION METHOD, AND MODE SELECTION PROGRAM

FIELD OF THE INVENTION

The present invention relates to an information processing apparatus, a mode selection method, and a mode selection program.

BACKGROUND OF THE INVENTION

Recently, the rate of camera-carrying information processing apparatuses such as laptop personal computers (hereinafter called "laptop PCs") and the like has been increasing. A camera mounted in an information processing apparatus is used, for example, for chatting using a VoIP application such as Skype (registered trademark), doing video conferencing, and the like, i.e., mainly used to take shots or video of a user of the information processing apparatus. For the above uses, the camera is placed to face the user. Therefore, the camera-carrying information processing apparatus is equipped with a privacy mode function to keep such a state that the user will not be displayed, such as to mask a camera image, from the standpoint of privacy protection or the like (see Patent Document 1).

[Patent Document 1] Japanese Patent Application Laid-Open No. 2012-119774

SUMMARY OF THE INVENTION

However, the user is required to perform burdensome operations in order to set the privacy mode, such as to operate the information processing apparatus to open a property screen of the mounted camera and set the privacy mode from this property screen.

Further, when the occasion to use the camera arises after setting the privacy mode, the user is also required to perform similar burdensome operations in order to release the privacy mode. Thus, the user is required to perform troublesome operations in order to set or release the privacy mode, lacking user-friendliness.

The present invention has been made in view of such circumstances, and it is an object thereof to provide an information processing apparatus, a mode selection method, and a mode selection program, capable of setting a privacy mode intuitively and easily.

In order to solve the above problems, the present invention adopts the following measures.

An information processing apparatus according to a first aspect of the present invention includes: an imaging unit configured to acquire an image; a determination unit configured to acquire an output value related to the brightness of the image acquired by the imaging unit to determine whether the output value related to the brightness of the image meets a predetermined condition; and a mode selection unit configured to select a privacy mode when the determination unit determines that the output value related to the brightness of the image meets the predetermined condition.

A mode selection method according to a second aspect of the present invention includes: an imaging step to acquire an image; a determination step to acquire an output value related to the brightness of the image acquired in the imaging step and determine whether the output value related to the brightness of the image meets a predetermined condition; and a mode selection step to select a privacy mode when it is determined in the determination step that the output value related to the brightness of the image meets the predetermined condition.

A mode selection program according to a third aspect of the present invention causes a computer to execute: an imaging process to acquire an image; a determination process to acquire an output value related to the brightness of the image acquired in the imaging process and determine whether the output value related to the brightness of the image meets a predetermined condition; and a mode selection process to select a privacy mode when it is determined in the determination process that the output value related to the brightness of the image meets the predetermined condition.

The above-described aspects of the present invention have the effect of allowing a user to set the privacy mode intuitively and easily.

DETAILED DESCRIPTION OF THE INVENTION

One embodiment of an information processing apparatus 1 according to the present invention will be described below with reference to the accompanying drawings. In the embodiment, the description will be made by taking a laptop PC as an example of the information processing apparatus 1. However, the information processing apparatus 1 is not limited to the laptop PC, and it may be a desktop PC, or a portable information processing terminal such as a tablet or a smartphone.

Figure 1:
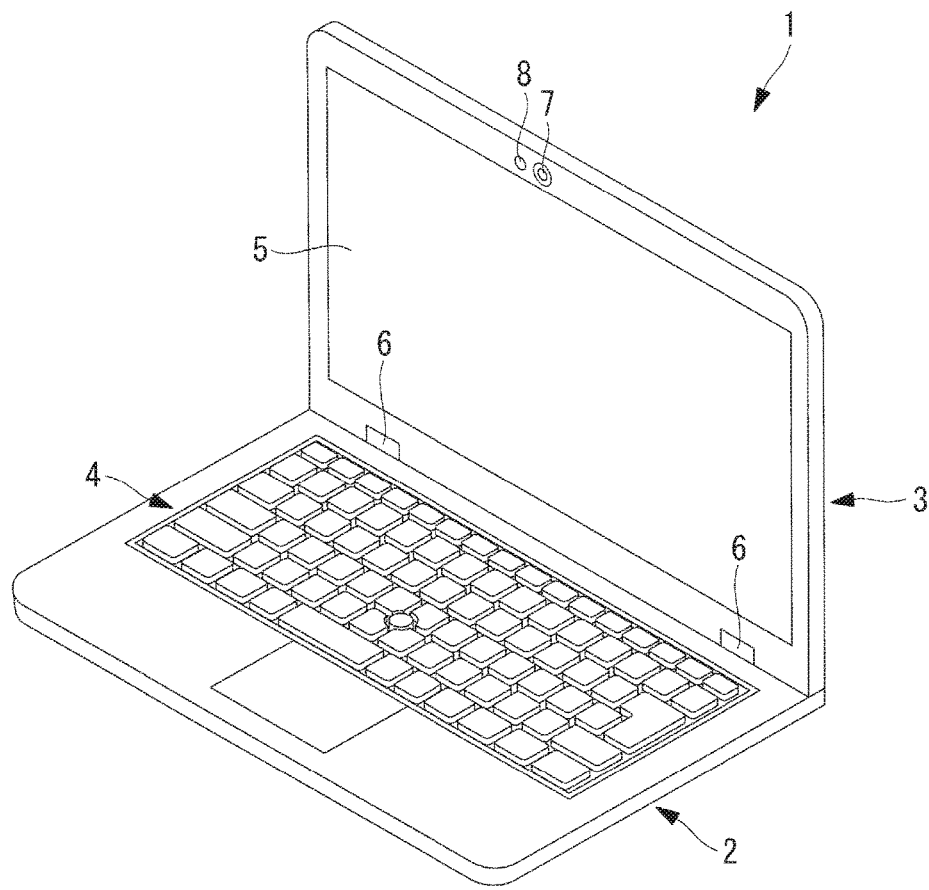
FIG. 1 is a schematic external view of an information processing apparatus according to one embodiment of the present invention.

FIG. 1 is a schematic external view of the information processing apparatus 1 according to the embodiment of the present invention.

As an example, the information processing apparatus 1 includes a main body-side chassis 2 and a display-side chassis 3, both of which have substantially rectangular parallelepiped shapes, as illustrated in FIG. 1.

The main body-side chassis 2 includes an input unit 4. The input unit 4 is a user interface to allow a user to perform input operations, having a keyboard composed of various keys used to enter characters, commands, and the like, a touch pad used to move a cursor on a screen, select any one of various menus, and the like.

The display-side chassis 3 includes a display unit 5 that displays images. In the embodiment, the display unit 5 is an LCD (Liquid Crystal Display), but the display unit 5 is not limited to the LCD. The display unit 5 may be another display unit such as an organic EL (Electroluminescence) display, or a touch panel. The LCD converts input display data to a video signal, and displays, on a display screen, various pieces of information according to the converted video signal.

The display-side chassis 3 also includes a camera 7 and a light source 8 to acquire an image. The camera 7 is arranged substantially at the center of the display-side chassis 3 above the display screen side of the LCD to be able to take an image of a front subject. The light source 8 is arranged substantially at the center of the display-side chassis 3 above the display screen side of the LCD to emit, to the front subject, auxiliary light involved in shooting with the camera 7.

The main body-side chassis 2 and the display-side chassis 3 are joined in respective end portions by a pair of right and left joining parts 6. The joining parts 6 are hinges to support the main body-side chassis 2 and the display-side chassis 3 openably and closably.

Figure 2:
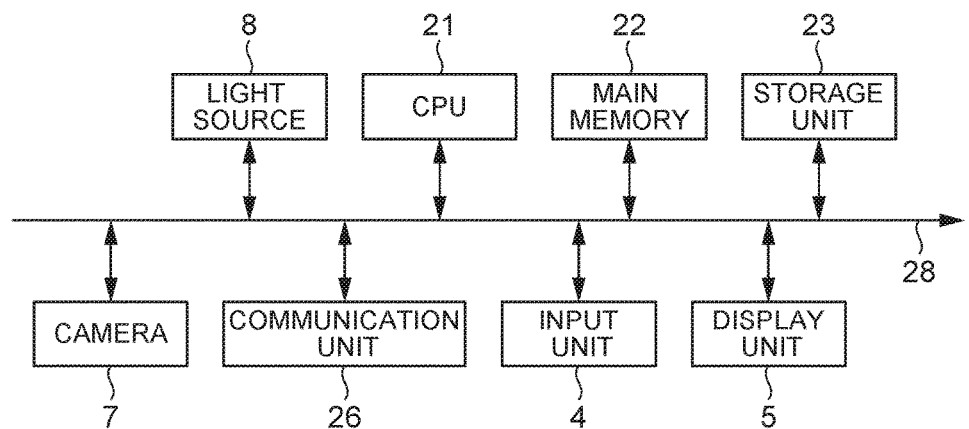
FIG. 2 is a diagram illustrating the hardware configuration of the information processing apparatus according to the embodiment of the present invention.

FIG. 2 is a block diagram illustrating a schematic hardware configuration of the information processing apparatus 1 according to the embodiment of the present invention. For example, the information processing apparatus 1 includes a CPU (Central Processing Unit) 21, a main memory 22, a storage unit 23, a display unit 5, an input unit 4, a communication unit 26, the camera 7, and the light source 8. These units are connected to one another directly or indirectly through a bus 28.

For example, the CPU 21 controls the entire information processing apparatus 1 under an OS (Operating System) stored in the storage unit 23 connected through the bus 28, and executes various programs stored in the storage unit 23 to execute various processes such as a mode selection process to be described later.

The main memory 22 is composed of a cache memory and a RAM (Random Access Memory), which are writable memories used as working memories to read a program executed by the CPU 21 and write data processed by the execution program.

The storage unit 23 is, for example, a ROM (Read Only Memory), an HDD (Hard Disk Drive), a flash memory, and the like to store the OS, such as Windows (registered trademark), iOS (registered trademark), Android (registered trademark), or the like, to control the entire information processing apparatus 1, various hardware drivers for operating peripheral devices, applications for use in specific business, various data and files, and the like. Further, in the storage unit 23, a program to execute the mode selection process to be described later and various data necessary to execute the mode selection process are stored.

The display unit 5 is, for example, the LCD to provide a display under the control of the CPU 21.

The input unit 4 includes, for example, a keyboard, a mouse, and the like to be used by a user performing input operations.

The communication unit 26 is an interface to connect to a network so as to communicate with another information processing apparatus 1 in order to exchange information.

The camera 7 is controlled by the CPU 21, for example, based on user's input operations and the like. The light source 8 emits auxiliary light involved in shooting with the camera 7 under the control of the CPU 21.

Figure 3:
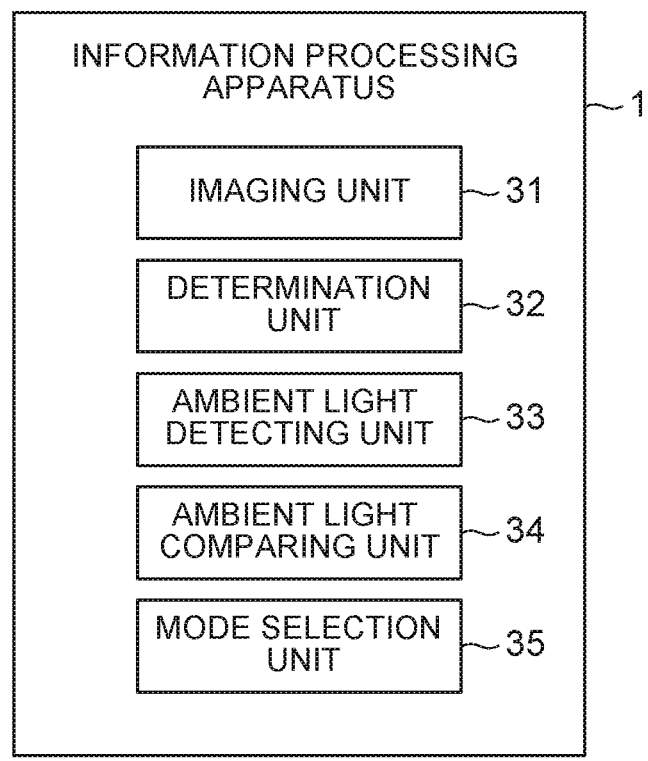
FIG. 3 is a block diagram illustrating a schematic configuration of the information processing apparatus according to the embodiment of the present invention.

FIG. 3 is a functional block diagram illustrating an example of the functions of the information processing apparatus 1. As illustrated in FIG. 3, for example, the information processing apparatus 1 includes, as main components, an imaging unit 31, a determination unit 32, an ambient light detecting unit 33, an ambient light comparing unit 34, and a mode selection unit 35. Various processes to be described later, which are implemented by these units, are implemented, for example, by the CPU 21 of the information processing apparatus 1 reading a mode selection program stored in the storage unit 23 into the main memory 22 and executing the mode selection program. For example, the mode selection program stored in the main memory 22 or the storage unit 23 may be a program downloaded from a predetermined server or installed and stored from a predetermined recording medium, or a program stored in the storage unit 23 at the time of manufacturing. The various processes for mode selection in the information processing apparatus 1 to be described later are implemented by the functions of the mode selection program.

In the embodiment, a case where the camera 7 is covered with a user's finger as an example will be described, but the camera 7 may be covered with a user's palm, or the like. In the embodiment, a user's action to cover the camera 7 with the finger does not include an action to cover the camera 7 with the finger for a long time. In other words, the user's action to cover the camera 7 with the finger means such shielding that the user touches the camera 7, for example, with the finger for a short time. When the camera 7 is an optical type camera, the state of covering the camera 7 is a state of blocking light to a sensor such as an image sensor that detects information based on the light inside the camera 7. Specifically, in the embodiment, the light is blocked by covering a lens of the camera 7 with the finger. However, the user's action is not limited to the action to cover the lens as long as the light to the sensor is blocked. For example, when there is a shielding object such as a shutter between the lens and the image sensor, the light to the sensor may be blocked by the shielding object.

The imaging unit 31 includes, for example, the camera 7 to capture an image and acquire image data to be processed. The camera 7 is arranged above the display surface on the display-side chassis 3 to shoot the user of the information processing apparatus 1. The imaging unit 31 also includes the light source 8 that emits auxiliary light upon shooting with the camera 7. An example of including the light source 8 is described, but the light source 8 can be omitted.

The camera 7 may be a camera for capturing an image obtained in the normal visual light range or an IR camera. When the camera 7 is an IR camera, an IR LED is used as the light source 8. Further, a 3D camera or the like may be used as the camera 7.

The determination unit 32 acquires an output value related to the brightness of the image acquired by the imaging unit 31, and determines whether the output value related to the brightness of the image meets a predetermined condition. For example, the output value related to the brightness of the image acquired by the imaging unit 31 is acquired to compare the output value related to the brightness of the image with a predetermined threshold value. For example, the output value related to the brightness of the image is compared with a preset threshold value to determine whether the camera 7 is covered with the user's finger or the like. The output value related to the brightness of the image illustratively means information indicative of the luminance or exposure of the acquired image, a frame rate set along with the brightness of the acquired image, a correction value used for automatic exposure compensation, a gain value of the image sensor, or the like. In the embodiment, the description is made by exemplifying a case where the frame rate set along with the brightness of the acquired image is adopted as the output value related to the brightness of the image. The frame rate of the information processing apparatus 1 varies along with the brightness of the image acquired by the imaging unit 31 such as 30 fps when the image is bright and 10 fps when the image is dark. Note that the above-mentioned frame rate is just an example, and the present invention is not limited thereto. Further, when the frame rate or the like is set by the imaging unit 31 not to vary according to the brightness of the acquired image, mode switching may not be performed.

The threshold value is set in the range between an output value related to the brightness of an image acquired from the imaging unit 31 before the camera 7 is covered and an output value related to the brightness of an image acquired from the imaging unit 31 after the camera 7 is covered so that respective output values can be discriminated from each other. In the embodiment, since the output value related to the brightness of each image is illustratively described as the frame rate, the threshold value is also described as the frame rate. Specifically, when the frame rate of the information processing apparatus 1 varies between 30 fps when the image is bright and 10 fps when the image is dark, a value capable of detecting that the camera 7 is covered with the finger can be set as the threshold value appropriately in the range from 30 fps to 10 fps.

The ambient light detecting unit 33 detects an ambient brightness of the information processing apparatus 1. Specifically, the ambient light detecting unit 33 is a sensor provided in the information processing apparatus 1 in a position different from the imaging unit 31. In the embodiment, the sensor is described as an ambient light sensor (hereinafter abbreviated as "ALS"). The ambient light detecting unit 33 detects, for example, an ambient illuminance to detect the ambient brightness of the information processing apparatus 1. The ambient light detecting unit 33 is not limited to the ALS as long as it is a sensor capable of detecting the ambient brightness.

The ambient light comparing unit 34 compares an output value related to the ambient brightness detected by the ambient light detecting unit 33 with a predetermined ambient threshold value. Specifically, the ambient light comparing unit 34 compares the output value related to the detected ambient brightness with an ambient threshold value for preset ambient brightness to determine whether the brightness around the information processing apparatus 1 is high. As will be described later, both determination results of the determination unit 32 and the ambient light comparing unit 34 can be referred to determine such a state that an image acquired by the imaging unit 31 is dark despite the fact that the brightness around the information processing apparatus 1 is high. Thus, it can be determined accurately that the camera 7 of the information processing apparatus 1 is covered by the user on purpose. In the embodiment, since the ambient light detecting unit 33 is the ALS to detect the illuminance, an illuminance capable of determining whether the brightness around the information processing apparatus 1 is high is set appropriately as the ambient threshold value.

Figure 4:
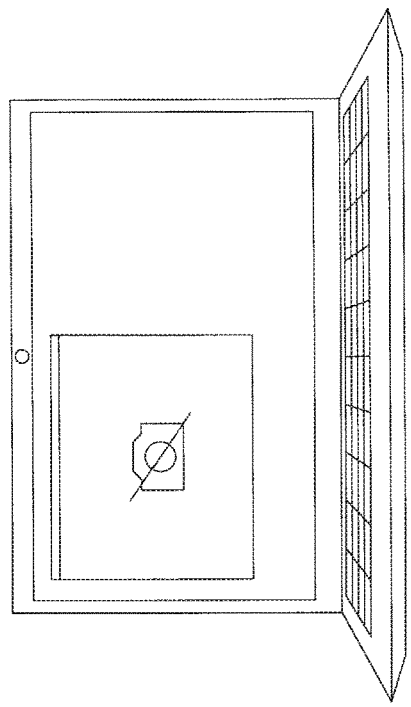
FIG. 4 is a schematic diagram related to a privacy mode of the information processing apparatus according to the embodiment of the present invention.
Figure 4:
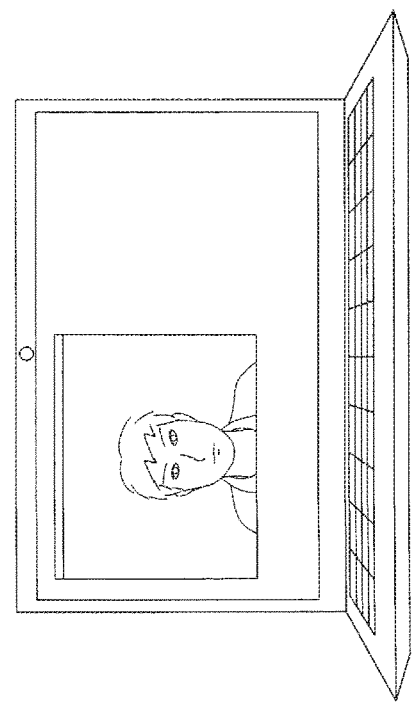

As illustrated in FIG. 4, the mode selection unit 35 selects either of an imaging mode to perform normal imaging (see the left side of FIG. 4), and a privacy mode (see the right side of FIG. 4) to put a restriction on the acquisition of an image in the imaging unit 31, the acquisition environment, or the output of the acquired image. In the privacy mode, for example, the imaging unit 31 is restricted not to acquire any image, the light source 8 included in the imaging unit 31 is turned off to restrict the auxiliary light not to output light upon image acquisition with the camera 7, the imaging unit 31 is restricted not to output image data to the outside even when imaging is performed, or image output is so restricted that an image to mask the captured image will be output to the outside instead of the captured image. In order to select a mode, both comparison results of the determination unit 32 and ambient light comparing unit 34 are input to the mode selection unit 35. As mode selection conditions, when the determination unit 32 determines that the frame rate of the image is less than the predetermined threshold value, and the ambient light comparing unit 34 determines that the ambient illuminance is more than the predetermined ambient threshold value, the mode selection unit 35 determines that the camera 7 is covered by the user on purpose and hence selects the privacy mode. Otherwise, the mode selection unit 35 determines that the camera 7 is not covered or the brightness around the information processing apparatus 1 becomes totally dark, and hence selects and sets the imaging mode.

In the state where the privacy mode is selected, the privacy mode may be released when the predetermined conditions on which the privacy mode is selected are met again, or when any other predetermined condition is met. Specifically, in the state where the privacy mode is selected, when the same conditions as the conditions on which the privacy mode was selected are met, that is, when the determination unit 32 determines that the frame rate of the image is less than the predetermined threshold value, and the ambient light comparing unit 34 determines that the ambient illuminance is more than the predetermined ambient threshold value, the mode selection unit 35 determines that the camera 7 is covered by the user on purpose again. In this case, the mode selection unit 35 may select the imaging mode, that is, release the privacy mode. Further, in the state where the privacy mode is selected, when a condition different from the conditions on which the privacy mode was selected is met, such as that the information processing apparatus 1 is powered off, the privacy mode may be released.

Figure 5:
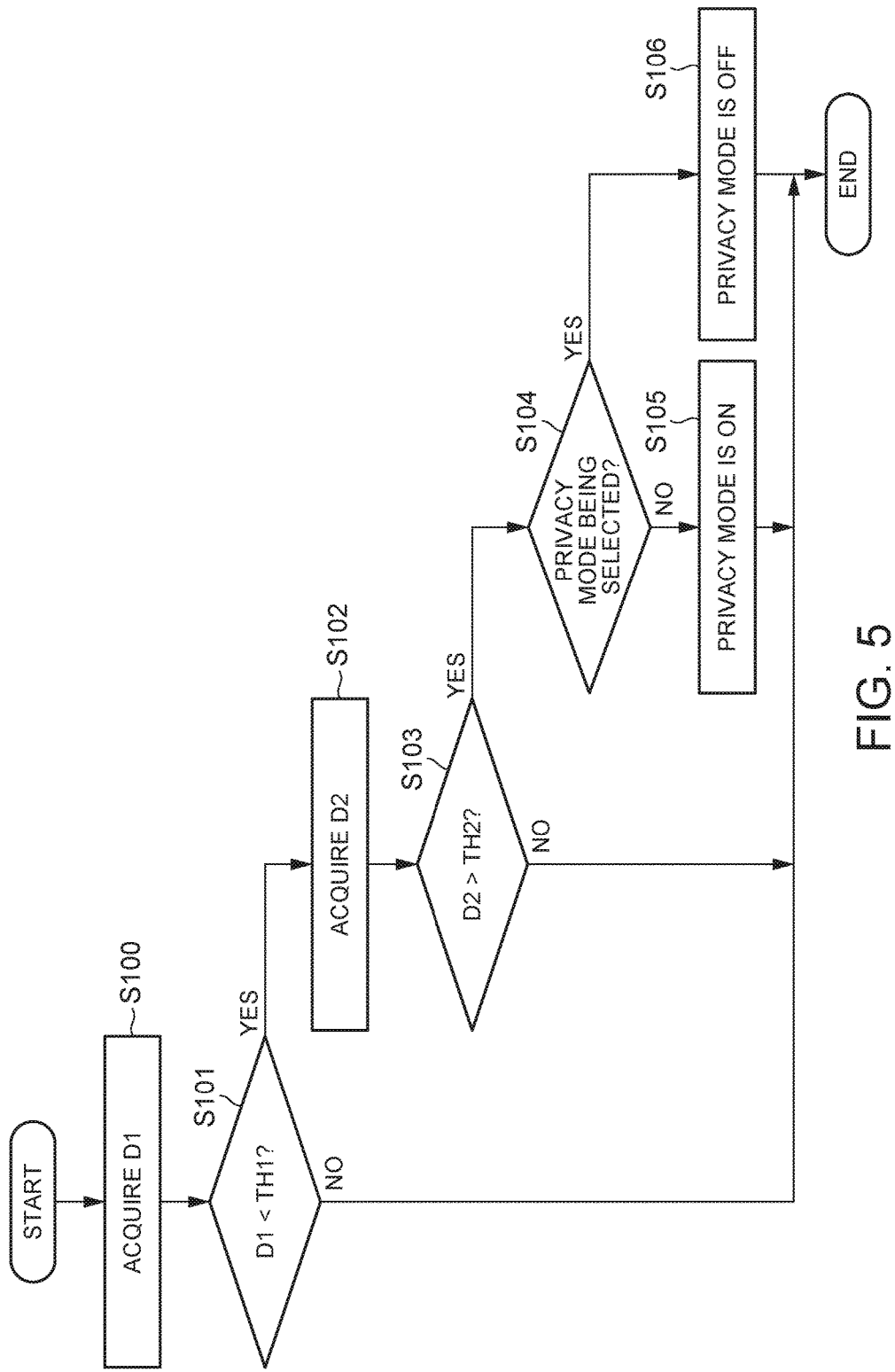
FIG. 5 is a flowchart related to the privacy mode setting of the information processing apparatus according to the embodiment of the present invention.

Next, a mode selection method executed by the information processing apparatus 1 according to the embodiment will be described. FIG. 5 is a flowchart illustrating a procedure of the mode selection method performed by the information processing apparatus 1 according to the embodiment. The processing flow illustrated in FIG. 5 is started, for example, when a VoIP application such as Skype (registered trademark) is started, and then repeated in predetermined periods. Note that the operation of the information processing apparatus 1 according to the embodiment may be carried out continuously and repeatedly in the background when the information processing apparatus 1 is started regardless of the start of a specific application.

When the information processing apparatus 1 is started, the determination unit 32 acquires a frame rate D1 of an image acquired by the imaging unit 31 (S100), and compares the frame rate D1 of the acquired image with a preset threshold value TH1 (S101).

When it is determined that the frame rate D1 of the image acquired by the imaging unit 31 is equal to or more than the preset threshold value TH1 (NO determination in S101), this processing is ended.

When it is determined that the frame rate D1 of the image acquired by the imaging unit 31 is less than the preset threshold value TH1 (YES determination in S101), the ambient light detecting unit 33 detects an ambient illuminance D2 of the information processing apparatus 1 (S102), and the ambient light comparing unit 34 compares the ambient illuminance D2 detected by the ambient light detecting unit 33 with a predetermined ambient threshold value TH2 (S103).

When the ambient light comparing unit 34 determines that the ambient illuminance D2 is equal to or less than the predetermined ambient threshold value TH2 (NO determination in S103), this processing is ended.

When the ambient light comparing unit 34 determines that the ambient illuminance D2 is more than the predetermined ambient threshold value TH2 (YES determination in S103), it is then determined whether the currently selected mode is the privacy mode (S104).

When the currently selected mode is determined not to be the privacy mode (NO determination in S104), the privacy mode is selected (S105). On the other hand, when the currently selected mode is determined to be the privacy mode (YES determination in S104), the imaging mode is selected. Thus, the privacy mode is released (S106).

In the embodiment, although the case where the operation illustrated in FIG. 5 is repeated in the predetermined periods is described, the processing may also be performed continuously and repeatedly without using the predetermined period.

As described above, according to the information processing apparatus 1 of the embodiment, the mode selection method, and the mode selection program, the user can set the privacy mode promptly when wanting to set the privacy mode by such an intuitive and simple way as to touch the camera 7 provided in the information processing apparatus 1 with the finger. Further, since the privacy mode can be released easily by performing a similar operation, the imaging mode and the privacy mode can be switched to each other without performing troublesome setting operations. Further, since the mode switching is controlled based on the output value related to the brightness of the image acquired by the imaging unit 31 and the output value related to the ambient brightness, accurate mode switching can be performed by simple comparisons without the need to perform image processing and the like. Therefore, the mode switching can be controlled with low power consumption without affecting the execution of any other program on the information processing apparatus 1.

[Variation 1]

Figure 6:
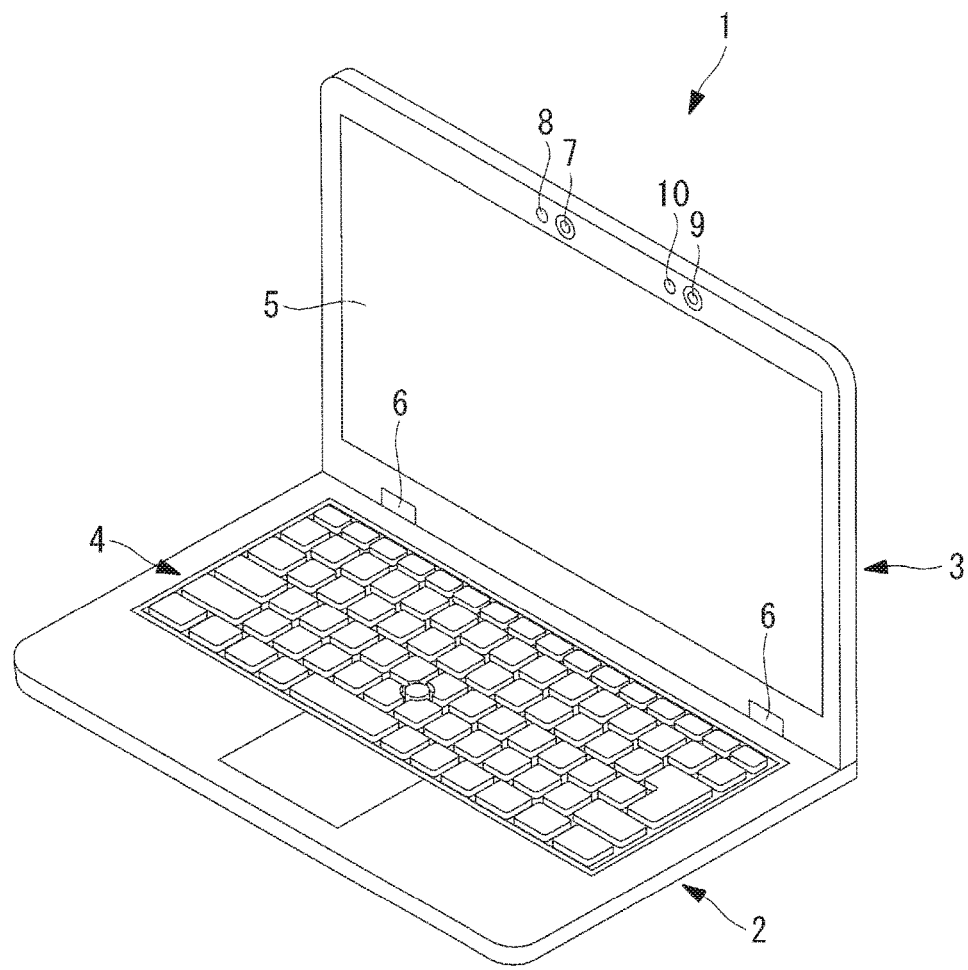
FIG. 6 is a schematic external view of an information processing apparatus according to one variation of the embodiment of the present invention.

As a variation of the embodiment, an IR camera 9 may also be provided as illustrated in FIG. 6 in addition to the camera 7 for capturing an image obtained in the visual light range. In this case, an IR LED 10 is provided as auxiliary light used to perform shooting with the IR camera 9. In this variation, control to select either the imaging mode or the privacy mode as mentioned above is applied to both or either of the camera 7 and the IR camera 9.

[Variation 2]

As another variation of the embodiment, among the mode selection conditions on which the mode selection unit 35 makes a selection, only the determination result of the determination unit 32 may be used without using the determination result of the ambient light comparing unit 34. When only the determination result of the determination unit 32 is used as the mode selection condition, the privacy mode is selected when the determination unit 32 determines that the frame rate D1 of the image is less than the predetermined threshold value TH1. Then, in the state where the privacy mode is being selected, the privacy mode may be released when the determination unit 32 determines that the frame rate D1 of the image is less than the predetermined threshold value TH1.

[Variation 3]

The output values related to the brightness of images acquired by the imaging unit 31 may be different between a case where the camera 7 is covered by the user under a bright environment and a case where the camera 7 is covered by the user under a dark environment. Therefore, as still another variation of the embodiment, a threshold value setting unit may further be provided to change the threshold value used by the determination unit 32 according to the ambient brightness. In this case, since the threshold value with which the output value related to the brightness of an image acquired by the imaging unit 31 is compared is also changed according to the ambient environment (brightness), more accurate mode switching can be performed.

Specifically, the threshold value is changed to increase the brightness when the ambient brightness of the information processing apparatus 1 is equal to or more than a preset first criterion value, and the threshold value is changed to decrease the brightness when the ambient brightness of the information processing apparatus 1 is equal to or less than a second criterion value smaller than the first criterion value. Further, without being limited to this example, a table in which the ambient brightness and the threshold value are associated with each other may be provided to set the threshold value according to the ambient brightness by referring to this table.

Further, the threshold value mentioned above may also be changed according to the output value related to the brightness of the image acquired from the imaging unit 31, or changed based on the output value related to the ambient brightness detected by the ambient light detecting unit 33.

[Variation 4]

When the user closes the information processing apparatus 1 (laptop PC) (nonuse state), since the camera 7 is shielded, the output value related to the brightness of an image to be acquired becomes less than the predetermined threshold value. In such a situation, especially in the case where only the determination result of the determination unit 32 is used as the mode switching condition like in the variation 2, there is a possibility that mode switching unintended by the user may be performed by closing the information processing apparatus 1. Therefore, as yet another variation of the embodiment, a use state determination unit may further be provided to determine whether the information processing apparatus 1 is in use. In this case, when the information processing apparatus 1 makes a transition from the nonuse state to the use state, the mode selected just before the mode selection unit 35 is put into the nonuse state may be maintained. In this case, since the mode before the information processing apparatus 1 becomes the nonuse state is maintained even when the mode switching conditions are fulfilled, the mode switching unintended by the user can be prevented.

As the use state determination unit that determines whether the information processing apparatus 1 is in use, a sensor such as a lid switch to detect whether the information processing apparatus 1 is closed can be used. Further, when the information processing apparatus 1 used is a mobile terminal such as a smartphone, the sensor may be a G sensor or the like that determines whether the mobile terminal is placed with the screen directed downward. Further, it may be determined whether the information processing apparatus 1 is in a standby state such as a sleep mode to determine whether the information processing apparatus 1 is in use.

[Variation 5]

In a case where an openable and closable physical shielding object is provided for the camera 7 to cover the front face of the camera 7, when the physical shielding object is closed by the user, since the output value related to the brightness of the image acquired by the imaging unit 31 becomes less than the threshold value, the privacy mode is set. After that, when the physical shielding object is removed by the user, for example, when the physical shielding object is opened, the user expects to release the privacy mode in order to perform imaging. However, the information processing apparatus 1 according to the embodiment mentioned above is configured not to release the privacy mode only by the gesture of the user to open the physical shielding object, i.e., the privacy mode is maintained until the imaging unit 31 is covered again with the user's finger or the like.

Therefore, in order to improve user-friendliness, this variation is to enable the user to release the privacy mode easily with the user's operation to open the physical shielding object.

For example, suppose that the determination unit 32 determines that the state where the output value related to the brightness of the image is less than the predetermined threshold value is maintained for a predetermined time or more. In this case, the privacy mode is switched to the imaging mode in this variation when the output value related to the brightness of the image exceeds the predetermined threshold value. As the means used to cover the camera 7, for example, a plastic tape or the like may also be used. Here, the "predetermined time" is set on the assumption that the imaging unit 31 is covered with the physical shielding object for a long time, i.e., the "predetermined time" is set to a certain amount of time to distinguish from the user's operation to cover the camera 7 with the user's finger for a short time as described in the embodiment mentioned above.

Specifically, when it is determined that the output value related to the brightness of the image acquired by the imaging unit 31 is less than the predetermined threshold value, the privacy mode is first selected. Then, the time elapsed after the transition to the privacy mode is measured by a time measuring unit such as a timer. When this measured time is equal to or more than a predetermined time threshold value, it is determined that the camera 7 is covered with the physical shielding object. After that, when the determination unit 32 determines that the output value related to the brightness of the image is equal to or more than the predetermined threshold value, it is determined that the physical shielding object is removed from the imaging unit 31 to release the privacy mode. On the other hand, when the time measured by the time measuring unit is less than the predetermined time threshold value, the operation is determined to be the gesture of the user who intends to perform mode switching, and hence the privacy mode is maintained.

According to this configuration, the time measured by the time measuring unit is compared with the time threshold value to determine whether the camera 7 is covered with the user's finger or with the physical shielding object so as to determine, depending on the determination result, whether the privacy mode is maintained or released. Therefore, for example, even when the camera 7 is covered with the physical shielding object, the privacy mode can be maintained or released to match user's expectations. Further, there is no need to newly provide a sensor used to detect that the camera 7 is physically covered such as that the physical shielding object covers the camera 7.

In the case where the light source 8 is provided, if the light source 8 is covered with the physical shielding object together with the camera 7, the heat dissipation of the light source 8 may be impaired. Therefore, it is helpful to turn off the light source 8 in the privacy mode. Especially, when the IR LED 10 highly required to dissipate heat is used, the light source 8 can be turned off. For example, when the camera 7 is the IR camera 9 and an IR LED is used as the light source 8, or when the IR camera 9 and the IR LED 10 are provided like in the variation 1 mentioned above, it is helpful to turn off the light source 8 and the IR LED 10 in the privacy mode.

[Variation 6]

As yet another variation of the embodiment, it may be determined whether the camera 7 is covered, based on the output value related to the color of an image acquired by the imaging unit 31 in combination with the output value related to the brightness of the acquired image. In this variation, a color determination unit is provided, in addition to the configuration of the above-mentioned embodiment, to determine whether the image acquired by the imaging unit 31 is a single color or not, and the mode selection unit 35 sets/releases the privacy mode based on the comparison result of the determination unit 32 and the comparison result of the color determination unit.

For example, when the camera 7 is covered with a child's finger, thin paper, or the like, or when the camera 7 is covered in a very bright place such as outdoors, since the image acquired from the imaging unit 31 does not become dark enough, there is a possibility that an accurate determination as to whether the camera 7 is covered cannot be made merely by the output value related to the brightness of the image. Specifically, when the camera 7 is covered with the child's finger or the like, the image acquired by the imaging unit 31 becomes a little dark and turns totally red. Therefore, an evaluation value related to red color, e.g., chromaticity (such as a range indicating a ratio of R, G, and B), is preset. In this case, when the whole screen acquired by the imaging unit 31 can be evaluated as having the same chromaticity, it is determined that the camera 7 is covered by the user regardless of the output value related to the brightness of the image to perform mode switching. Thus, covering the imaging unit 31 by the user can be detected more accurately, and hence accurate mode switching, i.e., setting and releasing the privacy mode, can be performed.

The evaluation value related to the color evaluated by the color determination unit is not limited to the evaluation value related to red color, and the evaluation value can be set for any color. In other words, the color determination unit in this variation determines whether the whole screen is a uniform color regardless of the shades of the color, and in the case of the uniform color, it may be determined that the camera 7 is covered to perform mode switching.

According to this configuration, since mode switching is performed according to whether the image is a single color in such a situation that the image acquired from the imaging unit 31 is not dark enough even when the camera 7 is covered by the user to set the privacy mode, the determination as to the brightness of the image can be complemented and hence more accurate mode switching can be performed.

We claim:

1. An information processing apparatus, comprising:
   an imaging unit configured to acquire an image;
   a determination unit configured to acquire an output value related to brightness of the image acquired by the imaging unit and to determine whether the output value related to the brightness of the image meets a predetermined condition;
   an ambient light detecting unit configured to detect ambient brightness; and an ambient light comparing unit configured to compare the ambient brightness detected by the ambient light detecting unit with a predetermined ambient threshold value; and a mode selection unit, separate from the determination unit, and configured to select a privacy mode when the determination unit determines that both (1) the output value related to the brightness of the image meets the predetermined condition and (2) the ambient light comparing unit determines that a degree of the ambient brightness is more than the predetermined ambient threshold value.

2. The information processing apparatus according to claim 1, wherein the information processing unit, when in the privacy mode, is further configured to put a restriction on an acquisition environment of the image by the imaging unit or output of the acquired image, and when the privacy mode is selected, the mode selection unit is further configured to release the privacy mode on condition that the output value related to the brightness of the image is determined to meet the predetermined condition again or meet another condition.

3. The information processing apparatus according to claim 1, further comprising:

a threshold value setting unit configured to set a threshold value according to information related to ambient brightness, wherein the determination unit compares the output value related to the brightness of the image with the threshold value set by the threshold value setting unit to determine whether to meet the predetermined condition.

4. The information processing apparatus according to claim 3, wherein the threshold value setting unit sets the threshold value using the output value related to the brightness of the image as information related to ambient brightness.

5. The information processing apparatus according to claim 3, further comprising:

wherein the threshold value setting unit sets the threshold value using, as information related to ambient brightness, an output value related to the ambient brightness detected by the ambient light detecting unit.

6. The information processing apparatus according to claim 1, further comprising:

a use state determination unit configured to determine whether the information processing apparatus is in use, wherein, when the information processing apparatus makes a transition from a nonuse state to a use state, the mode selection unit maintains a mode selected just before the information processing apparatus is put into the nonuse state.

7. The information processing apparatus according to claim 1, further comprising:

a time measuring unit configured to measure a duration during which the determination unit determines that the output value related to the brightness of the image continuously meets the predetermined condition.

8. The information processing apparatus according to claim 1, further comprising:

a color determination unit configured to determine color of the image acquired by the imaging unit, wherein the mode selection unit selects the privacy mode based on the determination result of the color determination unit in addition to the determination result of the determination unit.

9. The information processing apparatus according to claim 1, further comprising:

a threshold value setting unit configured to change a threshold value used by the determination unit according to the ambient brightness.

10. A mode selection method, comprising:

an imaging step to acquire an image;

a determination step to acquire an output value related to brightness of the image acquired in the imaging step and to determine whether the output value related to the brightness of the image meets a predetermined condition; and a mode selection step to select a privacy mode when it is determined in the determination step that the output value related to the brightness of the image meets the predetermined condition;

wherein the output value related to the brightness of the image is information indicative of a frame rate set along with the brightness of the acquired image.

11. A non-transitory computer readable medium with computer executable instructions stored thereon, executed by a processor, to perform a method for selecting an operational mode, the method comprising:

an imaging process to acquire an image;

a determination process to acquire an output value related to brightness of the image acquired in the imaging process and to determine whether the output value related to the brightness of the image meets a predetermined condition; and a mode selection process to select a privacy mode when it is determined in the determination process that the output value related to the brightness of the image meets the predetermined condition;

wherein, in the determination process, a frame rate D1 of the image is acquired and the frame rate D1 is compared with a preset threshold value TH1;

when the frame rate D1 is equal to or more than the preset threshold value TH1, the determination process is ended;

when the frame rate D1 is less than the preset threshold value TH1, an ambient illuminance D2 is detected and compared with a predetermined ambient threshold value TH2;

when the ambient illuminance D2 is equal to or less than the predetermined ambient threshold value TH2, the determination process is ended;

when the ambient illuminance D2 is more than the predetermined ambient threshold value TH2, it is then determined whether a currently selected mode is the privacy mode.

* * * * *